United States Patent
Bailey, III et al.

(10) Patent No.: US 6,869,582 B2
(45) Date of Patent: Mar. 22, 2005

(54) PROCESS FOR THE SYNTHESIS OF BRSF$_5$

(75) Inventors: Wade H. Bailey, III, Emmaus, PA (US); William Jack Casteel, Jr., Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 191 days.

(21) Appl. No.: 10/350,715

(22) Filed: Jan. 24, 2003

(65) Prior Publication Data

US 2004/0146453 A1 Jul. 29, 2004

(51) Int. Cl.$^7$ ............................................... C01B 17/45
(52) U.S. Cl. ................................... 423/460; 423/467
(58) Field of Search ............................ 423/467, 466, 423/472

(56) References Cited

U.S. PATENT DOCUMENTS

| | | | |
|---|---|---|---|
| 3,035,893 A | 5/1962 | Roberts et al. | |
| 3,338,685 A | 8/1967 | Merrill | |
| 6,479,645 B1 * | 11/2002 | Lal et al. | 556/427 |
| 6,579,805 B1 * | 6/2003 | Bar-Gadda | 438/710 |

OTHER PUBLICATIONS

Cohen., et al, Inorg. Chem. 4 (12) (1965) 1782–5, no month.
Kovacina, T.A., et al, J. Fluorine Chem. 7 (1976) 430–2, no month.
Rahbarnoohi, L.C., et al, Inorg.Chem. 22 (1983) 840, no month.
Christe, K.O., et al, Spectrochim. Acta 33A (1977) 69, no month.
Seppelt, et al, Chem. Ber. 116 (1983) 2399–2407, no month.
Winter, et al, J. Fluorine Chem. 89 (1998) 105–6, no month.
Steunenberg, et al, J. Am. Chem. Soc. 79 (1957) 1320–1323, no month.
Christe, et al, Inorg. Chem. 9, 8 (1970) 1852–1853, no month.
Nakamoto, "Infrared and Raman Spectra of Inorganic and Coordination Compounds," Whiley, NY (1997) 224, no month.
Christe, et al, Inorg. Chem. 11, 7 (1972) 1679–1682, no month.
K.O. Christe, et al, "Vibrational Spectrum and Normal Coordinate Analysis of SF5Br," Spectrochimica Acta, 1977, P. 69–73, vol. 33, no month.
R. Winter, et al, "An Improved and Facile Preparation of SF5Br," Jour. of Fluorine Chem., Elsevier Sequoia, Apr. 30, 1998, P. 105–106, vol. 89, No. 1.

* cited by examiner

*Primary Examiner*—Ngoc-Yen Nguyen
(74) *Attorney, Agent, or Firm*—Geoffrey L. Chase

(57) ABSTRACT

A process for producing BrSF$_5$ includes providing a first reactant including a metal fluoride of fluorine and a metal M selected from the group consisting of alkali metals, alkaline earth metals, and Ag, providing a second reactant including BrF$_3$, combining the first reactant and the second reactant to form a mixture, wherein the first reactant and the second reactant are allowed to contact for a period of time sufficient to produce MBrF$_4$ in an amount stoichiometrically equivalent to a quantity of BrF$_3$, and providing a third reactant including SF$_4$, wherein the third reactant reacts with MBrF$_4$. The process for producing BrSF$_5$ can further include providing a fourth reactant including Br$_2$, wherein the fourth reactant is provided before, during and/or after providing the first reactant, the second reactant and/or the third reactant. BrSF$_5$ is produced in a yield of from about 50% to about 99.99% based on the amount of SF$_4$.

33 Claims, No Drawings

PROCESS FOR THE SYNTHESIS OF BRSF$_5$

BACKGROUND OF THE INVENTION

This invention relates to a process of producing an inorganic sulfur containing fluorine compound and more particularly pentafluorosulfur bromide (BrSF$_5$).

BrSF$_5$ is useful as a source of the pentafluorosulfur group (SF$_5$) for introduction into organic compounds. The introduction of the SF$_5$ group into organic molecules can significantly modify their physical, chemical, and biological properties. These modifications are useful in a variety of applications for products such as biologically active compounds, pharmaceuticals, perfluorinated blood substitutes, surface-active agents, agrochemicals and solvents for polymers. Further, BrSF$_5$ can be used as an oxidizing agent.

BrSF$_5$ can be produced by a variety of methods. For example, U.S. Pat. No. 3,338,685 to Merrill describes a process for producing BrSF$_5$ comprising contacting a reaction mixture of SF$_4$, Br$_2$, and bromine pentafluoride (BrF$_5$) in a sealed reactor at a temperature of about 50° C. to about 180° C. to obtain a 39% isolated yield of BrSF$_5$ based on the amount of BrF$_5$.

Other investigators have produced BrSF$_5$ by heating a large excess of Br$_2$ with S$_2$F$_{10}$ at 138°–150° C. for 16–24 hours. The observed yield of BrSF$_5$ was 77–85% based on the amount of S$_2$F$_{10}$ consumed. See Cohen et al., *Inorg. Chem.* 4 (12): 1782–1785; (1965); Kovacina et al., *J. Fluorine. Chem.* 7:430–432 (1976); and Rahbarnoohi et al., *Inorg. Chem.* 22: 840–841 (1983).

Subsequently, others have obtained low to moderate yields of BrSF$_5$ by reacting bromine fluoride (BrF) with sulfur tetrafluoride (SF$_4$), in the presence of catalytic CsF. See Christe et al., *Spectrochimica Acta*. 33A (1977): 69–73; Winter et al., *J. Fluorine Chem.* 89 (1998): 105–106, and Seppelt et al., *Chem. Ber.* 116 (1983): 2399–2407).

Winter et al. reported a nearly quantitative (88.2–99.6% yield) synthesis of BrSF$_5$ involving a six-week, room temperature, multi-step process of reacting BrF$_3$ and Br$_2$ with SF$_4$ in the presence of catalytic CsF. In the first step or a preliminary reaction period of the synthesis of BrSF$_5$, which lasted for 6 to 11 days at room temperature BrF$_3$ and Br$_2$ were reacted in the presence of catalytic CsF to form BrF. The second step or a reaction period involved reacting BrF with SF$_4$ and lasted 36 days at room temperature or 20 days at elevated temperatures.

Similarly, Seppelt et al. described a synthesis of BrSF$_5$, referencing Christe et al. (1977), as a two-step process wherein the first step of making BrF took 14 days at room temperature. The second step was performed at 90° C. for 15 hours and yielded 36% of BrSF$_5$ based on the amount of SF$_4$ consumed.

Steunenberg et al. *J. Am. Chem. Soc.* 79 (1957): 1320–1323 demonstrated that BrF$_3$ and Br$_2$ are in a temperature-dependent equilibrium with BrF.

These syntheses are not attractive candidates for industrial or even pilot-scale production of BrSF$_5$ since they require successive steps, entail long reaction times, provide incomplete conversion of limiting reactants, or form large amounts of SF$_6$ as a byproduct.

Accordingly, it is desired to provide an improved, scalable synthesis of BrSF$_5$. It is further desired to prepare BrSF$_5$ at high yields with relatively short reaction times. The increasing interest in SF$_5$ containing chemicals and the limited availability of BrSF$_5$ provided the motivation to develop an improved process for synthesis of BrSF$_5$.

All references cited herein are incorporated herein by reference in their entireties.

BRIEF SUMMARY OF THE INVENTION

The present invention provides a process for producing BrSF$_5$ comprising providing a first reactant comprising a metal fluoride of fluorine and a metal M selected from the group consisting of alkali metals, alkaline earth metals, and Ag; providing a second reactant comprising BrF$_3$; combining the first reactant and the second reactant to form a mixture, wherein the first reactant and the second reactant are allowed to contact for a period of time sufficient to produce MBrF$_4$ in an amount stoichiometrically equivalent to a quantity of BrF$_3$; and providing a third reactant comprising SF$_4$, wherein the third reactant reacts with MBrF$_4$ to produce BrSF$_5$.

Also provided is a process for producing BrSF$_5$, said process comprising: providing a first reactant comprising a metal fluoride of fluorine and a metal M selected from the group consisting of alkali metals, alkaline earth metals, and Ag; providing a second reactant comprising BrF$_3$; combining the first reactant and the second reactant to form a mixture, wherein the first reactant and the second reactant are allowed to contact for a period of time sufficient to produce MBrF$_4$; and providing a third reactant comprising SF$_4$, wherein the third reactant reacts with MBrF$_4$ to produce BrSF$_5$; wherein the first reactant, the second reactant and the third reactant are provided in any order consecutively or simultaneously and Br$_2$ is present in a Br$_2$ amount stoichiometrically less than a quantity of said BrF$_3$.

The invention also provides an improvement in a method for synthesizing BrSF$_5$ comprising combining Br$_2$, BrF$_3$, and a metal fluoride of fluorine and a metal M selected from the group consisting of Cs and K to form a preliminary reaction mixture, reacting the preliminary reaction mixture for a preliminary reaction period, and adding SF$_4$ to the preliminary reaction mixture after the preliminary reaction period to form a reaction mixture to produce a yield of BrSF$_5$ during a reaction period, the improvement wherein the preliminary reaction period is less than 144 hours. In addition to reducing the preliminary period, the reaction period is also reduced to last less than 36 days and the yield of BrSF$_5$ is at least 50% based on the amount of SF$_4$ at room temperature, and preferably at least 88.2%.

DETAILED DESCRIPTION OF THE INVENTION

This invention is an improved process for the synthesis of BrSF$_5$ and comprises reacting a tetrafluorobromate (BrF$_4$)$^-$ and excess Br$_2$ with SF$_4$.

The invention also relates to a process for the synthesis of BrSF$_5$ by reacting a metal tetrafluorobromate MBrF$_4$ and bromine (Br$_2$) with sulfur tetrafluoride (SF$_4$), wherein M is a member selected from the group consisting of alkali metals, alkaline earth metals, and Ag, and preferably, M is a member selected from the group consisting of Cs, K, Ba, Rb, Na, and Sr.

The invention herein disclosed was driven by the desire to develop a process for producing BrSF$_5$ at high yields with significantly shorter reaction time than the time known in the prior art. The desired product BrSF$_5$ is obtained in high yields and preferably contains no SF$_4$ or S$_2$F$_{10}$ and only traces of SF$_6$. In a preferred embodiment of the present invention, BrSF$_5$ is produced in a yield of from about 50% to about 99.99% based on the amount of SF$_4$ used in the process.

The present invention flows from the surprising discovery that (BrF$_4$)$^-$ salts can be used effectively as a reagent to produce BrSF$_5$ by reacting with SF$_4$ and Br$_2$ or SF$_4$ alone to yield from about 50 to 99.99% BrSF$_5$ by weight based on the amount of SF$_4$. While (BrF$_4$)$^-$ salts alone can convert SF$_4$ to BrSF$_5$ at about 50% yield by weight based on the amount of SF$_4$, SF$_6$ is formed as a major byproduct. The inventors discovered that the use of Br$_2$, preferably in an amount stoichiometrically equivalent to or up to 50 times the amount of MBrF$_4$, substantially increases the selectivity of BrSF$_5$ formation.

A preferred embodiment of the present invention is illustrated by equations (1) and (2) below wherein the metal fluoride is represented by a general formula MF, wherein M is a metal selected from the group consisting of alkali metals, alkaline earth metals and Ag, more preferably M is a metal selected from the group consisting of Cs, K, Ba, Rb, Na and Sr. In alternative embodiments of the present invention, the metal fluoride is a metal fluoride mixture comprising at least two different metal fluorides, more preferably the metal fluoride is at least one of CsF and KF.

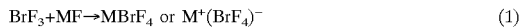

BrF$_3$+MF→MBrF$_4$ or M$^+$(BrF$_4$)$^-$     (1)

MBrF$_4$+Br$_2$+3SF$_4$→3BrSF$_5$+MF     (2)

Even though the process is shown as a two-step reaction, the references to a first reaction and a second reaction and to the first, second, third and fourth reagents are made herein for illustrative purposes and not to establish an order of addition of the reagents. The reagents can be added simultaneously or in an order different from that presented by the equations; e.g., either Br$_2$ or SF$_4$ or both can be added before, during and/or after providing BrF$_3$ and/or metal fluoride.

In certain embodiments of the present invention, the metal fluoride is provided in an amount stoichiometrically equivalent to or in excess (e.g., up to 50 times) of the quantity of BrF$_3$. In the present invention, metal fluoride can be treated to be at least 90% by weight pure.

BrF$_3$ can be prepared by methods known in the art or obtained commercially. In certain embodiments of the present invention, BrF$_3$ is treated by methods known in the art to be at least 50% pure and contain up to 50% by weight of Br$_2$ and up to 15% HF by weight.

(BrF$_4$)$^-$ salts are well known and can be synthesized by complexation of an anhydrous fluoride donor with BrF$_3$ or by careful fluorination of a bromide salt as described by Christe et al., *Inorg. Chem.* 9, 8 (1970): 1852–1853.

In certain embodiments of the present invention, SF$_4$ acts as a limiting agent and is provided in an amount less than an amount stoichiometrically equivalent to the amount of MBrF$_4$, wherein a stoichiometric ratio of SF$_4$ to MBrF$_4$ is 3:1. SF$_4$ can be prepared by methods known in the art or obtained commercially. Commercial SF$_4$ often contains the contaminant S$_2$F$_2$, which reacts vigorously with (BrF$_4$)$^-$ at low temperatures to produce SF$_4$. The removal of S$_2$F$_2$ from the SF$_4$ feed effectively prevents its highly exothermic oxidation, which could pose a significant safety hazard at large scales.

Sometimes, HF can be introduced as a contaminant of SF$_4$. HF causes dissociation of MBrF$_4$ to form unwanted byproducts such as MHF$_2$, and thereby reduces the amount of MBrF$_4$ available for reacting with SF$_4$. Hence, the amount of HF in a reaction is preferably limited to an amount insufficient to promote the disassociation of MBrF$_4$ to the extent that an additional amount of metal fluoride would be required to compensate for such waste of a reagent. In certain embodiments of this invention, SF$_4$ is treated by methods known in the art to be at least 85% by weight pure; the contaminants including HF preferably comprise not more than 15% by weight.

In certain embodiments of the present invention, Br$_2$ is provided in an amount stoichiometrically equivalent to or up to 50 times the amount of MBrF$_4$, thereby increasing selectivity of BrSF$_5$ formation. Preferably, Br$_2$ is treated by methods known in the art to be at least 90% by weight pure, and more preferably to be 100% pure. In certain embodiments, Br$_2$ can be a distilled, anhydrous, acid-free reagent.

The reagents are provided at a temperature of from about −200° C. to about 150° C., preferably from about 20° C. to about 120° C., and more preferably from about 20° C. to about 100° C.

The reaction wherein BrSF$_5$ is formed can be conducted in the presence or absence of Br$_2$ and in a wide range of temperatures. Preferably, the temperature is in a range of about −20° C. to about 150° C., more preferably the temperature is in a range of about 20° C. to about 120° C., even more preferably the temperature is in a range of about 20° C. to about 100° C.

The invention also provides an improvement in a method for synthesizing BrSF$_5$ comprising combining Br$_2$, BrF$_3$, and a metal fluoride of fluorine and a metal M selected from the group consisting of Cs and K to form a preliminary reaction mixture, reacting the preliminary reaction mixture for a preliminary reaction period, and adding SF$_4$ to the preliminary reaction mixture after the preliminary reaction period to form a reaction mixture to produce BrSF$_5$ during a reaction period, the improvement wherein the preliminary reaction period is less than 144 hours.

Unexpectedly, the inventors have found that one of the advantages of the present invention as compared to known processes is in a significantly shortened process time. The prior processes required long reaction times of, e.g., up to six weeks, to produce BrSF$_5$ as disclosed by Winter et al., wherein the first step or the preliminary reaction period of producing BrF in the presence of CsF lasted for 6 to 11 days. Surprisingly, the inventors have found that due to the reactive nature of MBrF$_4$, the total process time can be significantly shortened by reducing or almost eliminating the preliminary reaction period. In certain embodiments of the present invention, BrF$_3$ and the metal fluoride are contacted to make MBrF$_4$ for a period of time, which is less than 6 days (144 hours) and can be almost instantaneous, thereby shortening the total process time of producing BrSF$_5$ by eliminating the need to wait 6 to 11 days as described above.

Surprisingly, the inventors discovered that in addition to reducing the preliminary period, the process time can be reduced by shortening the reaction period to less than 36 days and still obtain the yield of BrSF$_5$ of at least 50% based on the amount of SF$_4$.at room temperature, and preferably at least 88.2%. The yield of BrSF$_5$ increases with the addition of Br$_2$ preferably in the amount stoichiometrically equivalent to or up to 50 times the amount of MBrF$_4$, as described above.

In certain embodiments of the present invention, the process time is shortened by increasing the reaction temperature.

Advantageously, the metal fluoride can be recycled in the process of the present invention wherein the metal fluoride can be produced in a reaction of SF$_4$ with MBrF$_4$ in the presence or absence of $Br_2$. In addition, the metal fluoride can be replenished when depleted.

The process for the synthesis of $BrSF_5$ can also include an additional purification step including heating as described in Example 7 below to increase the desired quality of $BrSF_5$.

The invention will be illustrated in more detail with reference to the following Examples, but it should be understood that the present invention is not deemed to be limited thereto.

EXAMPLES

While operating conditions of the process of the present invention can be determined by persons skilled in the art using this disclosure as a guide, the following materials and techniques were used in the following Examples.

$BrF_3$ and $SF_4$ were obtained from Air Products and Chemicals Co., (Allentown, Pa.). $Br_2$ obtained from Acros (Acros Organics, Fair Lawn, N.J.) was purified and dried by refluxing with and distilling from KBr, refluxing with and distilling from $P_2O_5$, and storing in a nitrogen-purged glove box. CsF was dried by fusing it in a glassy carbon crucible at 900° C. in a $N_2$-purged muffle furnace. Next, CsF was cycled into a $N_2$-purged glove box through the ante-chamber while molten, and the cooled pellet was removed inside the glove box. The CsF pellets were stored in PTFE (poly (tetrafluoroethylene)) bottles in the glove box and were pulverized prior to use in a reaction. KF was fused at 1000° C. in a way similar to CsF.

Manipulation of all chemicals was performed in a $F_2$-passivated T316 stainless steel manifold or in a $N_2$-purged glove box. $BrF_3$ was distilled under static vacuum into a cooled FEP U-trap (FEP is a fluoroethylene polymer resin capable of continued service at 400° F. (204° C.) available from Saint-Gobain Performance Plastics, Co., France), wherein its mass could be determined. $BrF_3$ was then similarly transferred into the reaction vessel. $SF_4$ was measured using the vacuum manifold and then was condensed into reactors at low temperature. $Br_2$, CsF, and KF were weighed directly into reactors inside the glove box.

IR spectra were obtained using a Perkin Elmer Spectrum 1000 FTIR spectrometer and a 5 cm gas cell constructed from PTFE, T316 stainless steel, and AgCl windows. UV-Vis spectra were obtained using a Varian Cary 300 (Varian Inc., Lexington, Mass.) and a 5 cm gas cell constructed from PTFE (or TEFLON, a trademark of the Du Pont company), T316 stainless steel, and sapphire windows. The $^{19}F$ NMR spectrum for $BrSF_5$ was obtained using a Bruker 500 MHz FTNMR spectrometer (Bruker Optics Inc., Billerica, Mass.) and was referenced to $CFCl_3$. The IR spectrophotometer cell was treated with about 200 Torr (26.66 KPa) of $SF_4$ prior to each analysis to effectively remove adventitious moisture.

Product mixtures were transferred to T316 stainless steel Hoke cylinders (available from Hoke Inc.) and were degassed at −196° C. Smaller scale reactions were performed in either a $F_2$-passivated 60 mL FEP U-tube attached to T316 stainless steel bellows valves or $F_2$-passivated, 50 mL Parr reactors (available form Parr Instrument Co., Moline, Ill.). In order to minimize photolysis of $BrSF_5$, the FEP reactors were covered with aluminum foil or the hood lights were extinguished during experiments. Reactions at a scale greater than 20 mmol were performed in T316 stainless steel $F_2$-passivated 500 mL Parr reactors containing a 2" (5.08 cm) PTFE magnetic stir bar. All operations were carried out behind heavy shielding.

Example 1

Reaction of $BrF_3$ with CsF or KF to form $CsBrF_4$ or $KBrF_4$ 5 g (33 mmol) of CsF were charged to a FEP U-tube. 7 g (51 mmol) of $BrF_3$ were distilled onto the CsF at −196° C. Next, the reactor was sealed, and the reactor contents were allowed to warm to 20° C. A homogeneous liquid was observed. Excess of $BrF_3$ was evacuated through soda lime revealing the colorless, free-flowing $CsBrF_4$ salt in quantitative yield (9.5 g). $KBrF_4$ was also formed in high yields using KF instead of CsF in the same method.

Example 2

Reaction of $CsBrF_4$ with $SF_4$ in the Absence of $Br_2$ 5 g (17 mmol) of $CsBrF_4$ were produced in a FEP U-tube according to Example 1 above, and 10 mmol of $SF_4$ were condensed in at −196° C. The reactor contents were allowed to warm to 20° C. After 1 hour, FTIR analysis indicated the presence of both $SF_6$ and $BrSF_5$ in approximately equal quantities. The reactor was heated to 50° C. for 4 hours and then cooled to 20° C. FTIR analysis indicated increased quantities of both $SF_6$ and $BrSF_5$. This Example demonstrates that in the absence of $Br_2$, the yield of the desired product $BrSF_5$ is diminished due to formation of a byproduct $SF_6$.

Example 3

Reaction of $CsBrF_4$ and $Br_2$ with $SF_4$ 10 g (35 mmol) of $CsBrF_4$ were produced in a FEP U-tube according to Example 1 above, and 8 g (50 mmol) of $Br_2$ were added. 20 mmol of $SF_4$ were condensed onto the $CsBrF_4$ and $Br_2$ at −196° C., the reactor was sealed, and the contents were allowed to warm to 20° C. After 1 hour at room temperature, FTIR analysis indicated the presence of $BrSF_5$ in small quantities. After the reactor was heated to 50° C. for 4 hours, FTIR analysis indicated increased quantities of $BrSF_5$. The reaction was allowed to continue at 20° C., and all of the $SF_4$ was consumed in 10 days yielding only $BrSF_5$ and a trace of $S_2F_{10}$, wherein the $S_2F_{10}$ was presumably formed due to photolysis. This Example demonstrates that the addition of $Br_2$ increases the yield of the desired product $BrSF_5$ from that of about 50% in the absence of $Br_2$ to practically 99.99% by weight based on the amount of $SF_4$ used in the reaction.

Example 4

Reaction of $KBrF_4$ and $Br_2$ with $SF_4$

Example 3 was repeated using 6.8 g (35 mmol) of $KBrF_4$ instead of $CsBrF_4$. All $SF_4$ was consumed in 23 days at room temperature. FTIR analysis of the product mixture indicated the presence of $BrSF_5$ as the major product containing traces of $SF_6$ and $S_2F_{10}$. Similarly to Example 3, this Example demonstrates that the addition of $Br_2$ increases the yield of the desired product $BrSF_5$ to about 99.99% by weight based on the amount of $SF_4$ used in the reaction.

Example 5

High Temperature Reaction of $CsBrF_4$ and $Br_2$ with $SF_4$ 14.5 g (50 mmol) of $CsBrF_4$ were produced in a FEP U-tube as in Example 1, and then were transferred to a 500 mL Parr reactor. 11.2 g (70 mmol) of $Br_2$ were added to the reactor, and 50 mmol of $SF_4$ were condensed in and allowed to warm to 20° C. $SF_4$ can contain $S_2F_2$ as a precursor. Consequently, when the reactor temperature reached a temperature of −35° C., a noticeable exotherm, pressure surge, and a hissing sound due to the oxidation of $S_2F_2$ were observed. The reactor was heated to 60° C. for 1 hour then was cooled to 20° C. FTIR analysis indicated the presence of $BrSF_5$ in small quantities. This sequence was repeated at 70° C., 80° C., and 100° C. FTIR analysis for each temperature treatment indicated only increasing quantities of $BrSF_5$; no $SF_6$ or any other products could be observed by FTIR.

This process was repeated using $SF_4$ free of $S_2F_2$. The removal of $S_2F_2$ from the $SF_4$ feed eliminated the observed exotherm and produced the same results.

Example 6

Scaled Synthesis of $BrSF_5$

Synthesis of $BrSF_5$ was performed in separate reactions using 0.05, 0.10, 0.25, 0.80, and 1.6 moles of $SF_4$. $SF_4$ used in this experiment was treated to remove $S_2F_2$. All other reagents were used in the same ratios at each scale level. CsF was reused between each reaction, and fresh CsF was only added when increasing the scale. The example described below is a reaction performed at the 1.6 mole scale of $SF_4$. A 500 mL Parr reactor containing a PTFE stir bar and 650 mmol (99 g) of previously used CsF were charged with 1 mol (160 g) of $Br_2$. The reactor was cooled to –196° C. 640 mmol (89 g) of $BrF_3$ were measured into an FEP U-tube and then condensed onto the $Br_2$ and CsF. The reactor was allowed to warm to room temperature and was stirred for 1 hour to allow formation of $CsBrF_4$. The reactor was cooled again to –35° C., and 1.6 mol of $SF_4$ were condensed into the reactor. The reactor was sealed, allowed to warm to 20° C., and its contents were stirred for 7 days. FTIR analysis of the product mixture gas phase indicated the presence of only $SF_4$ and $BrSF_5$. The reaction mixture was heated to 30° C. for an additional 7 days. FTIR analysis indicated $BrSF_5$ as the major product containing traces of $SF_6$ which corresponds to the data reported by Nakamoto in *Infrared and Raman Spectra of Inorganic and Coordination Compounds, Part A: Theory and Applications*, 5$^{th}$ ed. Whiley, New York: 1997: page 224. The reactor was then cooled to –40° C. The contents of the reactor were distilled under static vacuum through a –78° C. FEP U-trap into a Hoke cylinder cooled to –196° C. The crude $BrSF_5$ (330 g) contained small amounts of $SF_6$ and $Br_2$ as impurities. The presence of $SF_6$ was confirmed by $^{19}$F-FTNMR. The presence of $Br_2$ was confirmed by UV-Vis.

Example 7

Purification of $BrSF_5$ by Distillation

The process for the synthesis of $BrSF_5$ can also include an additional purification step to increase the desired quality of $BrSF_5$. A distillation apparatus used in this Example was constructed from T316 stainless steel and possessed the following characteristics: 1) a 1" (2.54 cm) ID×12" (30.48 cm) fractional column filled with 0.16" (0.41 cm) Monel ProPak™ yielding approximately 15 theoretical plates, 2) 300 mL receiver and distillation pot, 3) a 12" (30.48 cm) coiled condenser, 4) a pressure rating of 1200 psig, 5) a 1/16" (0.16 cm) balance line to equilibrate pressure between the column and the receiver, 6) a pneumatic selector valve for determining the reflux ratio, and 7) a 6-point thermocouple across the fractional bed for determining the progress of the distillation.

The unit was passivated with diluted $F_2$ and evacuated. 312 g of crude $BrSF_5$ containing about 5% $SF_6$ and a trace of $Br_2$ were condensed into the distillation pot at a temperature of –78° C. With the selector valve set to 100% reflux, the cooling coil was set to an inlet temperature of –20° C., and the distillation pot was allowed to warm to room temperature. The difference of temperatures corresponding to the cooling coil's inlet and the outlet indicated that reflux was not achieved and that $SF_6$ dominated the vapor space. Aliquots of the headspace were vented to the vacuum manifold from the top of the condenser and analyzed by FTIR until a load was observed across the cooling coil and $SF_6$ was absent from the FTIR analysis. The distillation pot was heated to an external temperature of 40° C. and the selector valve was set to 80% reflux. The temperature across the fractional column was isothermal during the majority of the distillation. Once a temperature differential had penetrated half of the column, the distillation was halted, and the receiver contents were transferred to a Hoke cylinder. 301 g (97% recovery) of $BrSF_5$ were collected. FTIR analysis of the Hoke cylinder contents indicated only fundamentals for $BrSF_5$ as described in Example 6. UV-Vis analysis indicated the absence of $Br_2$.

The following Comparative Examples were conducted to illustrate various reactions when one or more of the reagents of the present invention were omitted.

Comparative Example 1

Reaction of $SF_4$ with $Br_2$ and CsF 3 g (20 mmol) of CsF and 4 g (25 mmol) of $Br_2$ were charged to a 50 mL Parr reactor. 20 mmol of $SF_4$ were condensed on to the CsF and $Br_2$ at –196° C. The contents of the reactor were allowed to warm to 20° C. and stand for 16 hours. FTIR analysis indicated no change in the gas phase composition. The reactor contents were heated to 50° C. for 4 hours then cooled to 20° C. No change was observed by FTIR. The reactor contents were heated to 100° C. for 4 hours then cooled back to 20° C. FTIR indicated that no reaction had taken place.

Comparative Example 2

Reaction of $SF_4$ with CsF

It has been reported that $SF_4$ and CsF do not combine at room temperature but do form $CsSF_5$ at 120° C. in the presence of excess $SF_4$. (See Christe et al., *Inorg Chem.* 11, 7 (1972): 1679–1682)). 2 g (13 mmol) of CsF were charged to an FEP U-tube, which was then evacuated. 10 mmol of $SF_4$ were condensed over CsF at –196° C., the reactor was sealed, and the contents were allowed to warm to 20° C. The reactor contents were heated to 50° C. for 8 hours, the reactor was cooled to –78° C., and $SF_4$ was evacuated through soda lime. No increase in mass of the recovered solid could be detected indicating that no $CsSF_5$ was formed.

Comparative Example 3

Reaction of $SF_4$ with $Br_2$ and $BrF_3$ 3 g (19 mmol) of $Br_2$ were charged to an FEP U-tube, and 2 g (15 mmol) of $BrF_3$ and 10 mmol of $SF_4$ were condensed in at –196° C. The reactor was sealed, and its contents were allowed to warm to 20° C. and stand for 16 hours. FTIR analysis indicated traces of $SF_6$ as the only product. The reaction temperature was increased to 50° C. for 8 hours. FTIR indicated only increased amounts of $SF_6$.

Comparative Example 4

Reaction of $SF_4$ with $BrF_3$ in HF 1.3 g (8.1 mmol) $Br_2$ were charged to a FEP tube reactor. The reactor was cooled to –78° C., evacuated, and 10 mL anhydrous HF were added under static vacuum. Warming to 20° C. resulted in two liquid phases with the bromine showing no appreciable solubility in HF. The system was pressurized at 10 psig (68.95 KPa) 20% fluorine in nitrogen and immediately bromine dissolution began to occur, giving a deep burgundy colored solution in HF. The system was evacuated to 2 psig (13.8 KPa) and restored to 10 psig (68.95 KPa) 20% $F_2$ until all the bromine had dissolved. This was further continued until the HF solution reached a lemon-yellow color indicative of $BrF_3$ with a small amount of $Br_2$ remaining. The solution was cooled to −78° C., and HF was evacuated until a pale yellow solid remained. On warming to 20° C., the solid melted below 0° C., indicating that some complexed HF had still been present. The addition of gaseous $SF_4$ to the reactor immediately resulted in rapid bromine formation at room temperature. IR analysis of the volatiles showed only $SF_6$, $SF_4$ and small amounts of HF. This is an extreme example of the detrimental effect of HF on a reaction involving $SF_4$ and $BrF_3$.

In view of the foregoing examples and disclosure, it should be apparent that the present invention described herein provides a facile, high-yielding process for the synthesis of $BrSF_5$, which can be accomplished in two weeks in comparison with prior art methods reporting six weeks for similar yields at the same temperature. The use of $(BrF_4)^-$ and $Br_2$ to selectively oxidize $SF_4$ to $BrSF_5$ is essentially accomplished in one step affording high selectivity and conversion. The use of $(BrF_4)^-$ also provides additional safety over the use of $BrF_3$ should the reaction be scaled-up and elevated temperatures be employed. In addition, the proposed process provides conservation of chemical materials by allowing the repeated use of the substrate metal fluoride (i.e. CsF) for making the $(BrF_4)^-$ salt and by recycling excess $Br_2$. The resulting product can easily be separated from most of the excess $Br_2$, providing a material that can be employed as is in chemical reactions or can be purified further by conventional means, thus, providing a process that can be easily scaled to at least multiple kilogram quantities.

While the invention has been described in detail and with reference to specific examples thereof, it will be apparent to one skilled in the art that various changes and modifications can be made therein without departing from the spirit and scope thereof.

What is claimed is:

1. process for producing $BrSF_5$, said process comprising:
   providing a first reactant comprising a metal fluoride MF, wherein the metal M is selected from the group consisting of alkali metals, alkaline earth metals, and Ag;
   providing a second reactant comprising $BrF_3$;
   combining the first reactant and the second reactant to form a mixture, wherein the first reactant and the second reactant are allowed to contact for a period of time sufficient to produce $MBrF_4$ in an amount stoichiometrically equivalent to a quantity of $BrF_3$; and
   providing a third reactant comprising $SF_4$, wherein the third reactant reacts with $MBrF_4$ to produce $BrSF_5$.

2. The process of claim 1, wherein the metal fluoride is a metal fluoride mixture comprising at least two different metal fluorides.

3. The process of claim 1, wherein the metal is a member selected from the group consisting of Cs, K, Ba, Rb, Na and Sr.

4. The process of claim 1, further comprising providing a fourth reactant comprising $Br_2$, wherein the fourth reactant is provided before, during and/or after providing the first reactant, the second reactant and/or the third reactant.

5. The process of claim 4, wherein the metal fluoride is at least one of CsF and KF.

6. The process of claim 4, wherein the period of time of the combining step is less than 6 days.

7. The process of claim 4, wherein the first reactant, the second reactant, the third reactant, and the fourth reactant are provided at a temperature of about −200° C. to about 150° C.

8. The process of claim 1, wherein the third reactant reacts with $MBrF_4$ at a first reaction temperature of about −20° C. to about 150° C.

9. The process of claim 8, wherein the first reaction temperature is about 20° C. to about 120° C.

10. The process of claim 8, wherein the first reaction temperature is about 20° C. to about 100° C.

11. The process of claim 4, wherein the third reactant reacts with $MBrF_4$ and $Br_2$ at a second reaction temperature of about −20° C. to about 150° C.

12. The process of claim 11, wherein the second reaction temperature is about 20° C. to about 120° C.

13. The process of claim 11, wherein the second reaction temperature is about 20° C. to about 100° C.

14. The process of claim 1, wherein the metal fluoride is provided in a metal fluoride amount stoichiometrically equivalent to or up to 50 times the quantity of $BrF_3$.

15. The process of claim 1, wherein $SF_4$ is provided in a $SF_4$ amount less than stoichiometrically equivalent to the amount of $MBrF_4$, and wherein a stoichiometric ratio of a $SF_4$ to $MBrF_4$ is 3:1.

16. The process of claim 4, wherein $Br_2$ is provided in a $Br_2$ amount stoichiometrically equivalent to or up to 50 times the amount of $MBrF_4$, thereby increasing selectivity of $BrSF_5$ formation.

17. The process of claim 1, wherein the first reactant is treated to be at least 90% by weight of the metal fluoride.

18. The process of claim 1, wherein the second reactant is treated to be at least 50% by weight of $BrF_3$, up to 50% by weight of $Br_2$, and up to 15% by weight of HF.

19. The process of claim 4, wherein the fourth reactant is treated to be at least 90% by weight of $Br_2$.

20. The process of claim 1, wherein the third reactant is treated to be at least 85% by weight of $SF_4$ and not more than 15% contaminants, the contaminants including HF.

21. The process of claim 1, wherein the metal fluoride is produced in a reaction of $SF_4$ with $MBrF_4$ and $Br_2$ and is replenished when depleted.

22. The process of claim 4, wherein $BrSF_5$ is produced in a yield of from about 50% to about 99.99% based on the amount of $SF_4$.

23. The process of claim 4, wherein the first reactant, the second reactant, the third reactant, and the fourth reactant are provided simultaneously.

24. The process of claim 1, wherein $MBrF_4$ ionizes to form a $(BrF_4)^-$ anion, and the $(BrF_4)^-$ anion selectively oxidizes $SF_4$ to produce $BrSF_5$.

25. A process for producing $BrSF_5$, said process comprising:
   providing a first reactant comprising a metal fluoride MF, wherein the metal M is selected from the group consisting of alkali metals, alkaline earth metals and Ag;
   providing a second reactant comprising $BrF_3$;
   combining the first reactant and the second reactant to form a mixture, wherein the first reactant and the second reactant are allowed to contact for a period of time sufficient to produce $MBrF_4$; and
   providing a third reactant comprising $SF_4$, wherein the third reactant reacts with $MBrF_4$ to produce $BrSF_5$;

wherein the first reactant, the second reactant and the third reactant are provided in any order consecutively or simultaneously, and $Br_2$ is present in an amount stoichiometrically less than a quantity of said $BrF_3$.

26. The process of claim 25, wherein the period of time is sufficient to produce $MBrF_4$ in an amount stoichiometrically equivalent to the quantity of said $BrF_3$.

27. The process of claim 25, wherein the metal fluoride is a metal fluoride mixture comprising at least two different metal fluorides.

28. The process of claim 25, wherein the metal is a member selected from the group consisting of Cs, K, Ba, Rb, Na, and Sr.

29. A method for synthesizing $BrSF_5$ comprising combining $Br_2$, $BrF_3$, and a metal fluoride MF, wherein the metal M is selected from the group consisting of Cs and K, to form a preliminary reaction mixture, reacting the preliminary reaction mixture for a preliminary reaction period, and adding $SF_4$ to the preliminary reaction mixture after the preliminary reaction period to produce a yield of $BrSF_5$ during a reaction period of less than 144 hours.

30. The method of claim 29, wherein the metal M is selected from the group consisting of Cs, K, Ba, Rb, Na, Sr, and Ag.

31. The method of claim 30, wherein the metal fluoride and $BrF_3$ are allowed to contact for a period of time sufficient to produce $MBrF_4$ in an amount stoichiometrically equivalent to a quantity of said $BrF_3$.

32. The method of claim 29, wherein the reaction period is less than 36 days and the yield of $BrSF_5$ is at least 50% at room temperature.

33. The method of claim 32, wherein the yield of $BrSF_5$ is at least 88.2%.

* * * * *